United States Patent [19]
Lanphere et al.

[11] 3,710,922
[45] Jan. 16, 1973

[54] APPARATUS FOR DETECTING AND REJECTING IMPROPERLY ORIENTED OBJECTS

[75] Inventors: Gerald B. Lanphere, Central Square; Seymour H. Bart, Liverpool; Jack W. Armstrong, Baldwinsville, all of N.Y.

[73] Assignee: Lipe-Rollway Corporation, Syracuse, N.Y.

[22] Filed: July 6, 1971

[21] Appl. No.: 159,757

[52] U.S. Cl.............................198/33 R, 209/111.7
[51] Int. Cl..............................................B65g 47/24
[58] Field of Search.........198/33 R; 209/74 R, 111.7

[56] References Cited

UNITED STATES PATENTS 3,369,642   2/1968   Hennig...............................198/33 R
3,447,662   6/1969   House.................................198/33 R
3,610,399   10/1971  Friedrich............................198/33 R

*Primary Examiner*—Richard A. Schacher
*Attorney*—Bruns & Jenney

[57] ABSTRACT

Apparatus utilizing a fiber optic system for detecting misorientation of an object passing on a conveyor. By means of the system light is projected onto the object and, if the latter is not properly oriented, the light is reflected back through the system and actuates a sensor. Upon actuation of the sensor, the apparatus operates through electromechanical means to remove the object from the conveyor.

7 Claims, 6 Drawing Figures

PATENTED JAN 16 1973  3,710,922

INVENTORS.
GERALD B. LANPHERE.
SEYMOUR H. BART.
JACK W. ARMSTRONG.
BY John R. Varney
ATTORNEY.

APPARATUS FOR DETECTING AND REJECTING IMPROPERLY ORIENTED OBJECTS

BACKGROUND OF THE INVENTION

This invention relates generally to detection systems, and more particularly to misorientation detecting systems for conveyors transporting cylindrical objects in which the length and the diameter are substantially equal.

Heretofore, it has been difficult to sense for proper orientation of cylindrical objects moving on conveyor systems if the length and diameter of the objects are nearly equal. Electrical switches have been used but do not provide the reliability required on a production set up.

SUMMARY OF THE INVENTION

In accord with a preferred embodiment of this invention, a detector system is provided for sensing and removing improperly oriented objects being conveyed in a continuous procession. Three dimensional objects are fed onto a conveyor in randomly oriented fashion and move in a single row toward a selection-rejection station. The latter includes fiber optic detection means which coact with electromechanical means to remove from the conveyor those objects which are not oriented in the required manner.

DESCRIPTION OF THE PREFERRED EMBODIMENT

Figure 1:
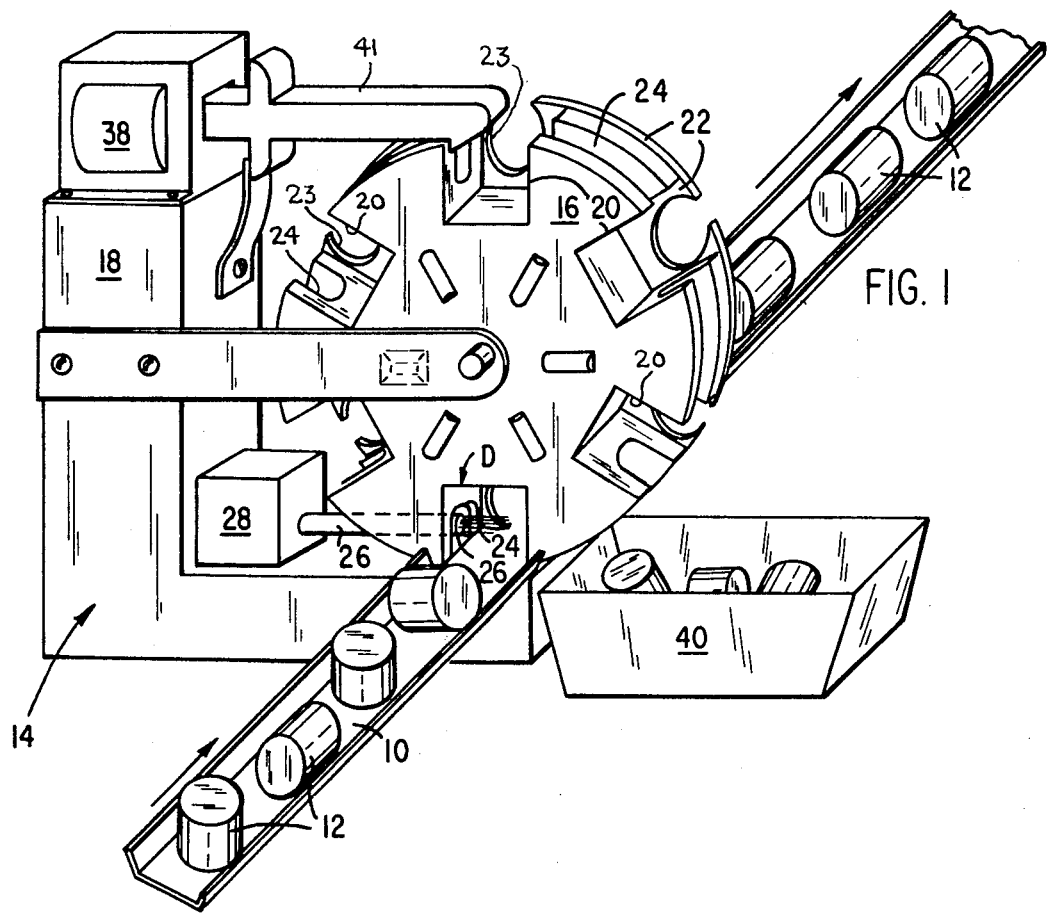
FIG. 1 is a perspective view of the invention.
Figures 2, 3, 4:
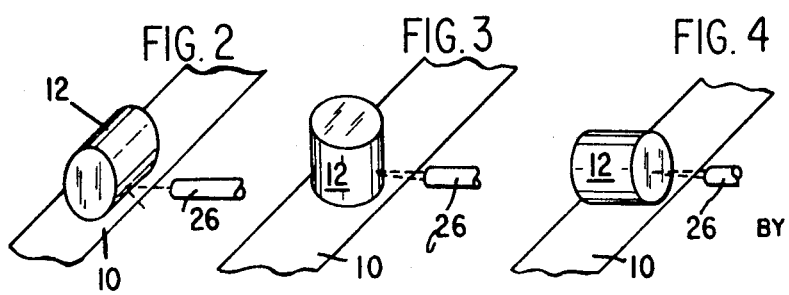
FIGS. 2, 3 and 4 are perspective views illustrating how detection of object orientation is sensed.

Referring to FIG. 1, there is shown an infeed conveyor 10 carrying a continuous procession of randomly oriented cylindrical objects 12, such as bearing rollers, toward sorting station 14. Sorting station 14 comprises a disc 16 positioned with its axis parallel to the conveyor and rotatably supported by frame member 18. As shown, disc 16 has six pockets 20 one of which is in alignment with the conveyor when the disc is not indexing, the pockets being dimensioned to receive the objects 12 regardless of their orientation. Disc 16 has a backing plate 22 secured to it which prevents unacceptably oriented objects from passing through the sorting station 14. To this end, the backing plate has six notches 23 closely conforming to the silhouette of the accepted orientation. The disc 16 is formed with a groove 24 about its periphery and straddles a fiber optic probe 26 that is a part of the fiber optic sensing system 28. The probe 26 is positioned in the groove 24 so as to project a beam of light into the detecting pocket D. When an object 12 passes through the pocket D it intercepts the beam of light and reflects it in the manner shown in FIGS. 2–4. In FIG. 2, the axis of the object is parallel to the length of the conveyor and in this position the object is properly oriented and can pass on through the conforming notch 23 of the back plate 22. The probe 26 is positioned so that its beam of light is above or, as shown in FIG. 2, below center of the cylindrical object 12 whereby the light beam is reflected up or down. In FIGS. 3 and 4, an object is respectively shown on its end and crosswise to the conveyor, neither of which position is acceptable. In both cases, the light beam will strike a perpendicular surface of the object and reflect back into the probe 26, as more clearly shown in FIG. 5.

Figures 5, 6:
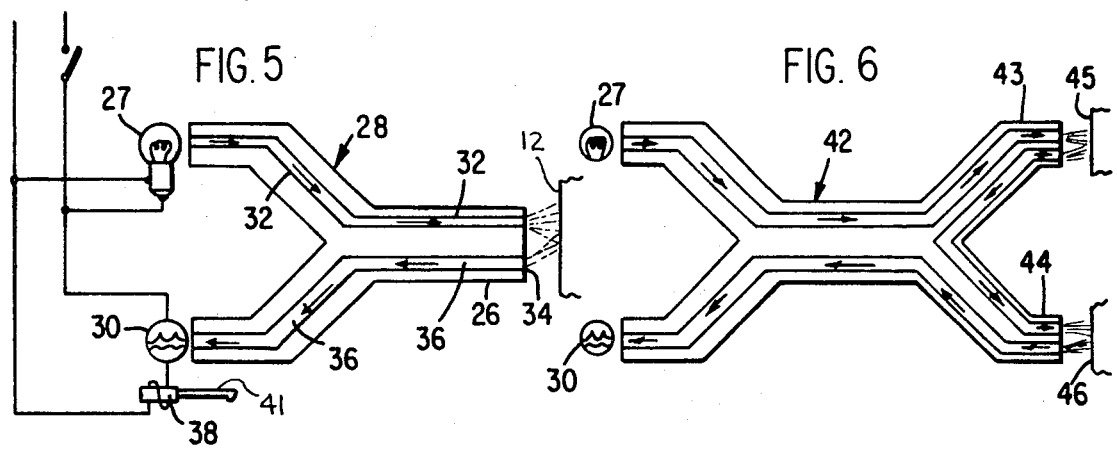
FIG. 5 is a schematic view of the fiber optic sensor and wiring diagram used in FIG. 1.
FIG. 6 is a schematic view of a dual probe fiber optic detector.

The fiber optic probe as shown in FIG. 5 includes a light source 27 and a light detector 30. As shown, light is transmitted from the light source or bulb 27 to the object 12 through transmitting fibers 32 and when the light is reflected back on the probe tip 34 it is transmitted by the receiving fibers 36 to the light detector 30. This causes the detector to become conductive and energize a circuit to solenoid 38, FIGS. 1 and 5, whereby its armature 39 is pulled in. This rotates disc 16 so that the improperly oriented roller is expelled into basket 40 and the next pocket 20 is brought into registry with the conveyor. Upon completion of aforementioned operation the sensor becomes nonconductive until it again receives a beam of reflected light. The solenoid 38 is mounted on frame 18 and its armature 39 is spring biased outwardly so it will be ready to be energized and reject the next improperly oriented object entering the registering pocket D. If properly oriented as in FIG. 2, no light is reflected into the probe tip and the object continues through the aligned notch 23 in the backing plate 22.

As illustrated, the detector is sensing misoriented objects the axes of which are perpendicular to the direction of travel. By repositioning the sensor the acceptable orientation may be changed. This sensor may be readily used with objects of other shapes and may be employed with systems using any number of discs similar to disc 16, each to perform a different function.

FIG. 6 shows a fiber optic probe 42 in which there are two sensing probes 43–44 that must project and receive light before the light rays are received by the light detector to energize a circuit. Thus, the light rays travel from bulb 27 to the first probe 43 and project on an object 45, reflected light received by the first probe is then transmitted to the second probe 44 and projected on a second object 46, and light reflected by the second object back to the second probe is transmitted to the light detector 30 to energize a circuit.

Those skilled in the art will readily see that fiber optic systems with one or more probes have many other uses as for safety circuits, object counters, measuring, flaw detention and the like. The fiber optic light detector may also be employed to energize a circuit when reflected light is not received. Also, by proper location of one or more sensors any combination of dimension, finish, position, flaw-no flaw, inspection and selection can be achieved.

While a preferred embodiment of the invention has been described and illustrated, it will be understood by those familiar with the art that the invention may be embodied in other specific forms without departing from the spirit or essential characteristics thereof.

We claim:

1. In an apparatus for detecting and rejecting improperly oriented objects being carried by an infeed means to a sorting and selection station: indexing sorting means at the station having a plurality of spaced apertures, the apertures being dimensioned to receive the objects regardless of their orientation, a selection plate coacting with the sorting means and having a pass-through aperture coincidental with the path of travel of the objects on the infeed means for passing properly oriented objects through the selection and sorting station, means at the station to detect misoriented objects entering an aperture of the sorting means, and means operable upon detection of a misoriented object in said aperture to index the sorting means and thereby remove the object from the infeed means.

2. Apparatus as defined in claim 1 wherein said detecting means is a fiber optic sensing system arranged to project light on an object entering an aperture of the sorting means, the sensing system being operable when light is reflected back into it from the object to actuate the indexing means.

3. Apparatus as defined in claim 1 wherein said detecting means is a fiber optic sensing system having a plurality of light projecting and receiving stations, said system being arranged so that each station must receive reflected light from an object at the station for the system to be operable to actuate the indexing means.

4. Apparatus as defined in claim 1 wherein said indexing sorting means comprises a rotatable disc member the apertures of which project radially inwardly from the periphery of the member, the disc member being indexible to successively move the apertures into registry with the path of travel of the objects on the infeed means.

5. An apparatus for detecting and rejecting improperly oriented objects being carried by a conveyor to a sorting and selection station comprising: an indexible disc rotatably mounted in the path of the conveyor and forming a part of the station, the disc having a plurality of circumferentially spaced peripheral apertures successively movable into registry with the path of travel of the objects on the conveyor, the apertures being dimensioned to permit the objects to pass therethrough regardless of their orientation on the conveyor, a fiber optic sensing system cooperable with a disc aperture in registry with the object travel path to detect misoriented objects passing through the aperture, and means operable upon detection of a misoriented object to index the disc and thereby push the object off the conveyor.

6. An apparatus as defined in claim 5 together with a selection plate mounted adjacent the disc on the exit side of the sorting and selection station, the plate having a passthrough aperture coincidental with the path of travel of the objects on the conveyor for passing properly oriented objects through the station and blocking misoriented objects.

7. Apparatus as defined in claim 5 wherein said fiber optic sensing system is arranged to project light on an object entering the disc aperture in registry with the object travel path, the sensing system being operable when light is reflected back into it from the object to actuate the indexing means.

* * * * *